(12) United States Patent
Graves et al.

(10) Patent No.: US 7,406,263 B2
(45) Date of Patent: Jul. 29, 2008

(54) COMBINED WAVEFRONT SENSOR AND DATA DETECTOR FOR A FREE SPACE OPTICAL COMMUNICATIONS SYSTEM WITH ADAPTIVE OPTICS

(75) Inventors: J. Elon Graves, Los Gatos, CA (US); Malcolm J Northcott, Felton, CA (US); J. Christopher Shelton, Los Gatos, CA (US)

(73) Assignee: AOptix Technologies, Campbell, CA (US)

( * ) Notice: Subject to any disclaimer, the term of this patent is extended or adjusted under 35 U.S.C. 154(b) by 515 days.

(21) Appl. No.: 10/688,575

(22) Filed: Oct. 16, 2003

(65) Prior Publication Data
US 2004/0086282 A1 May 6, 2004

Related U.S. Application Data

(60) Provisional application No. 60/419,878, filed on Oct. 18, 2002, provisional application No. 60/419,624, filed on Oct. 17, 2002.

(51) Int. Cl.
*H04B 10/00* (2006.01)

(52) U.S. Cl. .................. 398/119; 398/115; 398/118; 398/116; 398/120; 398/122; 398/123; 398/124; 398/125; 398/128; 398/129; 398/130; 398/131; 398/135; 398/136; 398/137; 398/202; 398/208; 398/209; 398/210; 398/212; 398/213; 398/214; 250/201.9; 250/491.1

(58) Field of Classification Search ............ 398/118, 398/115, 116, 119, 120, 122, 123, 124, 125, 398/128, 129, 130, 131, 135, 136, 137, 202, 398/208, 209, 210, 212, 213, 214; 250/491.1, 250/201.9
See application file for complete search history.

(56) References Cited

U.S. PATENT DOCUMENTS

| 5,233,174 | A | | 8/1993 | Zmek |
| 5,329,322 | A | | 7/1994 | Yancey |
| 5,532,858 | A | * | 7/1996 | Hirohashi et al. ............. 398/57 |
| 5,546,211 | A | * | 8/1996 | Devon ......................... 398/98 |
| 5,576,780 | A | | 11/1996 | Yancey |
| 5,777,719 | A | | 7/1998 | Williams et al. |
| 5,949,521 | A | | 9/1999 | Williams et al. |
| 6,023,057 | A | | 2/2000 | Gaffard et al. |
| 6,452,145 | B1 | | 9/2002 | Graves et al. |
| 2002/0196506 | A1 | | 12/2002 | Graves et al. |
| 2003/0001073 | A1 | * | 1/2003 | Presby et al. ............ 250/201.9 |
| 2003/0067657 | A1 | * | 4/2003 | Dimmler et al. ............ 359/159 |

OTHER PUBLICATIONS

Dreher, Andreas W. et al., "Active optical depth resolution improvement of the laser tomographic scanner," *Applied Optics*, vol. 28, No. 4, Feb. 15, 1989, pp. 804-808.

Graves, J. Elon et al., "First Light for Hokupa'a: 36 Element Curvature AO System at UH," *Proceedings of SPIE* vol. 3353, Mar. 1998, pp. 34-43.

(Continued)

*Primary Examiner*—Hanh Phan
(74) *Attorney, Agent, or Firm*—Fenwick & West LLP

(57) ABSTRACT

In an adaptive optics module, wavefront sensing and data detection are implemented in a single device. For example, an optical-to-electrical converter converts a data-encoded optical beam to an intermediate electrical signal, which contains both the data encoded in the beam and also wavefront information about the beam. The data and wavefront information are later separated, for example by frequency filtering.

43 Claims, 11 Drawing Sheets

OTHER PUBLICATIONS

Graves, J.E. et al., "Latest Results from the University of Hawaii Prototype Adaptive Optics System," *Univ. Hawaii Laser Guide Star Adaptive Optics Workshop: Proceedings*—vol. 1 (Mar. 10-12, 1992), pp. 511-521.

Roddier, C. et al., "New optical testing methods developed at the University of Hawaii; results of ground-based telescopes and hubble space telescope," SPIE, vol. 1531, *Advanced Optical Manufacturing and Testing II* (1991), pp. 37-43.

Roddier, Francois et al., "A Simple Low-Order Adaptive Optics System for Near-Infrared Applications," *Publications of the Astronomical Society of the Pacific*, vol. 103, No. 659, Jan. 1991, pp. 131-149.

Roddier, Francois, "Curvature sensing and compensation: a new concept in adaptive optics," *Applied Optics*, vol. 27, No. 7, Apr. 1, 1998, pp. 1223-1225.

Roddier, Francois, "Wavefront sensing and the irradiance transport equation," *Applied Optics*, vol. 29, No. 10, Apr. 1, 1990, pp. 1402-1403.

\* cited by examiner

COMBINED WAVEFRONT SENSOR AND DATA DETECTOR FOR A FREE SPACE OPTICAL COMMUNICATIONS SYSTEM WITH ADAPTIVE OPTICS

CROSS-REFERENCE TO RELATED APPLICATIONS

This application claims priority under 35 U.S.C. § 119)(e) to U.S. Provisional Patent Application Ser. No. 60/419,878, "Combined Wavefront Sensor And Data Detector for a Free Space Optical Data Transmission System," filed Oct. 18, 2002; and also claims priority under 35 U.S.C. § 119(e) to U.S. Provisional Patent Application Ser. No. 60/419,624, "Combined Wavefront Sensor And Data Detector for a Free Space Optical Data Transmission System," filed Oct. 17, 2002. The subject matter of all of the foregoing is incorporated herein by reference in their entirety.

BACKGROUND OF THE INVENTION

1. Field of the Invention

This invention relates generally to the field of free-space optical communications. More specifically, the invention relates to the use of adaptive optics (including for example tip/tilt correction) as an enhancement to a free-space optical communications link.

2. Description of the Related Art

With recent advances in technology, there is an increasing interest in the use of free-space optical communications for various applications. For example, much of the current telecommunications infrastructure is based on the transmission of optical signals via optical fibers. While the use of fiber optics has increased the capacity and efficiency of data transmission, there are many situations where the installation of new fiber is not the best solution. As a result, there is interest in augmenting the telecommunications infrastructure by transmitting optical signals through the free-space of the atmosphere.

Free-space optical communications links can also be used advantageously in applications outside of the telecommunications infrastructure. Compared to other communications technologies, a free-space optical communications link can have advantages of higher mobility and compact size, better directionality (e.g., harder to intercept), faster set up and tear down, and/or suitability for situations where one or both transceivers are moving. Thus, free-space optical communications links can be used in many different scenarios, including in airborne, sea-based, space and/or terrestrial situations.

However, in many of these potential applications, the free-space optical communications link suffers from optical aberrations. For example, changes in atmospheric conditions can be a significant impediment to the accuracy, reliability and efficiency of free-space optical communications systems. Wind, heat waves, man-made pollutants and other effects can create constantly changing aberrations. This, in turn, can degrade the quality of the optical signal that is available at the receiver, resulting in degradation of the overall quality and efficiency of the communications channel.

Adaptive optics can compensate for these aberrations, thus improving the performance of a free-space optical communications link. However, current free-space optical communications links that have adaptive optics capability typically use separate detectors for data detection and for wavefront sensing. The incoming optical beam typically is divided by a beamsplitter, with one portion directed to the data detector and the other portion to the wavefront sensor. However, this requires that the data detector and wavefront sensor be accurately registered with respect to each other. The use of two separate detectors and the resulting registration requirement adds cost and complexity to the overall system and can also reduce the reliability of the system.

As a result, it would be advantageous for adaptive optics systems to eliminate the need for two separate detectors.

SUMMARY OF THE INVENTION

The present invention overcomes the limitations of the prior art by providing an adaptive optics module in which wavefront sensing and data detection are implemented together. In one embodiment, such a device includes an optical-to-electrical converter coupled to a separation module. The optical-to-electrical converter converts a data-encoded optical beam to an intermediate electrical signal, where the intermediate electrical signal contains both the data encoded in the beam and also wavefront information about the beam. The separation module generates both an electrical wavefront signal and an electrical data signal from the intermediate electrical signal. The electrical wavefront signal contains the wavefront information and the electrical data signal contains the data.

In one approach, the wavefront information and the data are separated in frequency within the intermediate electrical signal. For example, the wavefront information may be located at frequencies that are lower than the frequencies where the data is located. The separation module separates the wavefront information and the data on the basis of frequency, for example by using tuned circuits/filters or an electrical crossover network.

In one embodiment, the optical-to-electrical converter includes multiple detector elements. Each of these receives a subaperture portion of the optical beam and converts it to an intermediate electrical signal. The intermediate electrical signals are combined for purposes of data detection and treated separately for purposes of wavefront sensing.

In a particular embodiment, the adaptive optics module uses a deformable curvature mirror to compensate for aberrations. For example, the deformable curvature mirror can be a sandwich of electro-restrictive materials with a pattern of electrode segments. The sandwich is deformed by applying different voltages to the electrode segments. The combined wavefront/data sensor includes a segmented detector and the deformable curvature mirror is imaged onto the segmented detector. In one embodiment, each segment in the detector corresponds to one of the electrode segments on the deformable curvature mirror. A membrane mirror located at a focal plane between the deformable curvature mirror and the segmented detector vibrates at a dither frequency, thus introducing a focus dither to the optical system. A crossover network receives the intermediate electrical signals from the segmented detector and separates the wavefront information (which is located around the dither frequency) from the data (which is located at frequencies much higher than the dither frequency) based on frequency.

Other aspects of the invention include adaptive optics modules, transceivers and FSO communications links and systems using the devices described above, and methods corresponding to all of the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Figure 1:
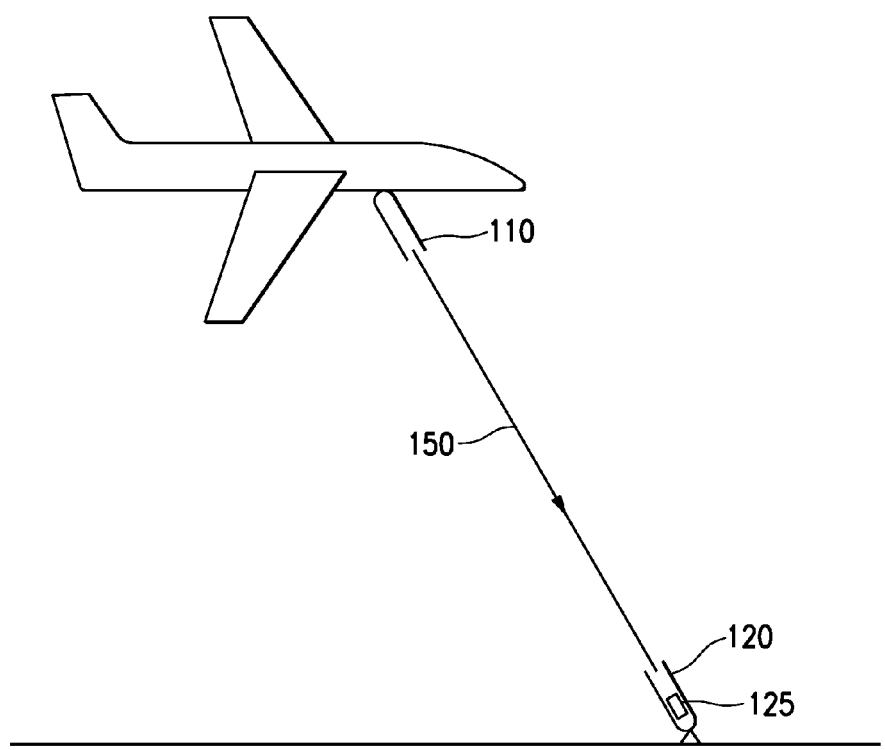
FIG. 1 is an illustration of a free-space optical communications system suitable for the present invention.
Figure 2:
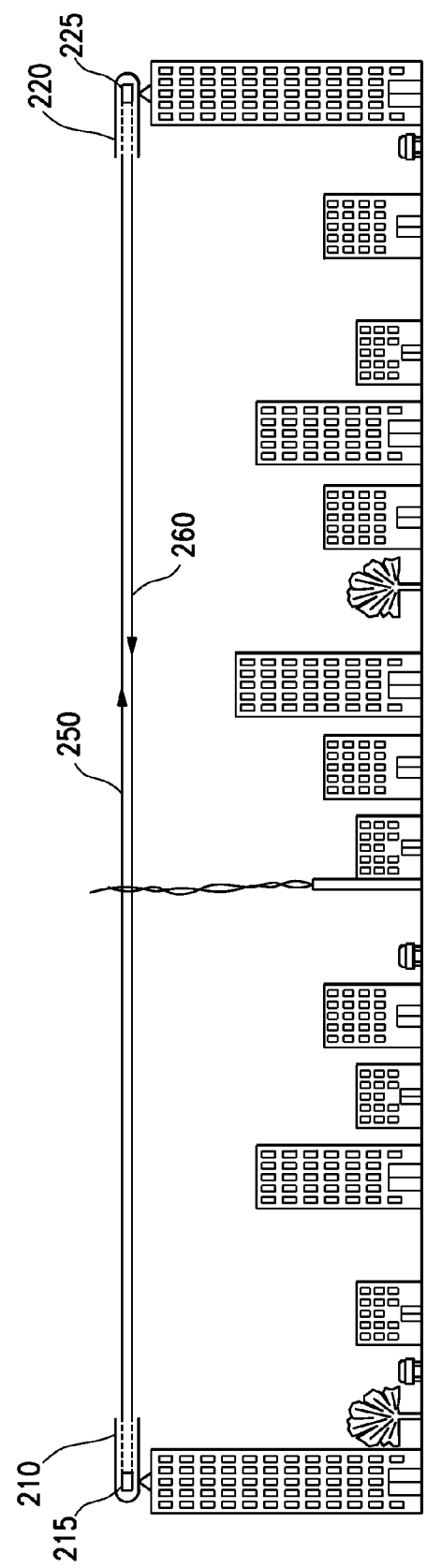
FIG. 2 is an illustration of another free-space optical communications system suitable for the present invention.
Figure 3:
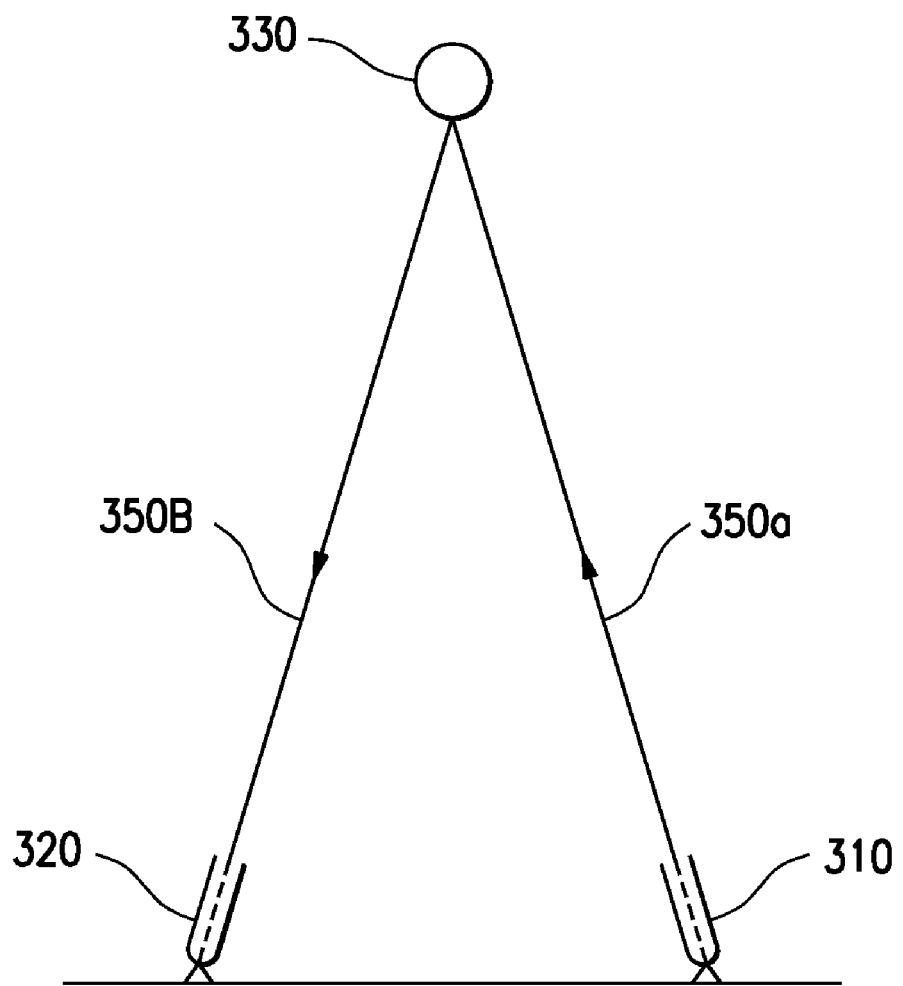
FIG. 3 is an illustration of yet another free-space optical communications system suitable for the present invention.

FIGS. 1-3 are illustrations of example free-space optical (FSO) communications systems using adaptive optics. The FSO communication system in FIG. 1 is designed to communicate data over a FSO data link 150 from an airborne transmitter 110 to a land-based receiver 120 which may be either stationary or mobile. For convenience, the term "transceiver" will be used to refer to modules that only transmit 110 and to modules that only receive 120, as well as to modules that both transmit and receive.

Each transceiver 110, 120 includes a telescope that is pointed at the telescope of the other transceiver. The transmitting telescope 110 typically includes components for tracking and directing an optical beam 150 to the receiving telescope 120. The receiving telescope 120 typically includes components for following and receiving the optical beam 150 from the transmitting telescope 110. Examples of components that can be used for these purposes include steering mirrors, mechanical gimbals, tracking mechanisms and control loops, auto-focus and zoom capability.

The FSO communications link 150 can suffer from time-varying aberrations. For example, for many applications, the effect of the atmosphere can be a significant source of aberrations. The density of the atmosphere generally varies across time and space, typically at a rate of about 1 kHz or less for turbulent cells. The resulting aberrations can cause unwanted effects, such as divergence resulting in beam wander, scintillation patterns at the receiver 120 and degraded wavefronts.

In the example of FIG. 1, these aberrations are corrected, either partially or fully, by an adaptive optics module 125 at the receiver 120. The adaptive optics module 125 corrects the wavefront of the incoming light, which in turn facilitates manipulating the optical beam at the receiver 120. Typically, the wavefront correction applied by the adaptive optics module 125 is determined by directly measuring the wavefront of the incoming optical beam 150 (usually after correction), although other methods for estimating the aberrations or the incoming wavefront can be used. The level of correction applied by an adaptive optics system is often referred to as the order of the adaptive optics system. For convenience, the term first order adaptive optics will be used to refer to adaptive optics systems that correct for tip, tilt and/or lower order aberrations (e.g., piston) but not for defocus or higher order aberrations. The term higher order adaptive optics will be used to refer to adaptive optics systems that correct for defocus and/or higher order aberrations.

FIG. 2 is an illustration of another FSO communications system using adaptive optics. In this example, the FSO communications system is used in an urban environment where a transmitter 210 and receiver 220 are located on the roofs of two buildings. FIG. 2 shows buildings of different heights, automobiles, roadways, trees and a smoke stack on one building, which create different atmospheric conditions. Rain, fog, smoke and the like lower the intensity of the transmitted light. Conditions such as sun-induced and structure-created heat waves, air conditioning discharges, heat exchanger discharges, automobile exhaust, etc. create aberrations along the optical link 250 in addition to the normal atmospheric aberrations caused by weather conditions. In rural applications, the varying terrain and vegetation can influence the aberrations along the optical link 250.

In FIG. 2, each transceiver 210, 220 includes an adaptive optics module 215, 225 in order to mitigate the atmospheric conditions that otherwise would adversely affect the transmission and reception of data-encoded light waves. In the transmitter 210, the adaptive optics 215 pre-corrects the wavefront of the outgoing light. This pre-correction reduces beam wander and scintillation patterns at the receiver 220, thus increasing the amount of light incident on the receiver 220 and also improving the wavefront quality of the received optical beam. At the receiver 220, the adaptive optics 225 corrects aberrations in the received wavefront, thus improving the image quality and/or collection efficiency at the receiver.

At the receiver 220, the wavefront correction applied by the adaptive optics module 225 is determined based on the wavefront of the incoming optical beam 250. A counter-propagating probe beam 260 is used for the adaptive optics module 215 at the transmitter 210. The probe beam 260 propagates along approximately the same optical path as the primary data-encoded beam 250, but in the opposite direction. It can be the same wavelength as or a different wavelength than the primary beam 250. The probe beam 260 experiences substantially the same aberrations as the primary beam 250 and the pre-correction applied by the adaptive optics module 215 is based on the wavefront of the probe beam 260. In a similar fashion, a co-propagating probe beam (not shown in FIG. 2) could be used at the receiver 225 as the basis for correcting the wavefront of the primary beam 250, rather than using the primary beam 250 itself.

In the dual-ended correction system of FIG. 2, the two adaptive optics modules 215, 225 may interact undesirably under certain conditions. In one approach to mitigating this effect, a characteristic propagation distance can be defined as $z0 = \pi\sigma^2/\lambda$, where $\sigma$ is the width of the projected beam (assumed to be Gaussian in this example) and $\lambda$ is the wavelength. For example, with a beam width $\sigma$ of 4 cm and a wavelength of 1.55 µm, the characteristic propagation distance would be approximately 3 km. For link distances that are less than the characteristic propagation distance, phase information may propagate from the transmitter 210 to the receiver 220, creating a feedback path through both adaptive optics modules 215, 225 and possibly causing instability in the adaptive optics modules. This effect can be reduced by reducing the size of the transmitted beam, for example with zoom optics. Alternatively, a differential focus between the transmitter 210 and the receiver 220 can be used to ensure that the aperture of the receiving telescope is not significantly underfilled. At link distances that are greater than the characteristic propagation distance, phase variations at the transmitter 210 are generally converted to amplitude variations at the receiver 220, with the data signal strength falling off as the square of the distance. As a result, phase instability is less of a problem at these longer link distances.

A second effect which occurs at link distances that are short compared to the characteristic propagation distance is that pupil illumination may become non-uniform. One remedy is to adjust the focus of the transmitting telescope 210 in order to spread the pupil illumination by the primary beam 250.

The communications links 150, 250 in FIGS. 1 and 2 are shown as unidirectional. Two separate unidirectional systems can be used to create a bi-directional system. More economically, the transmitter and receiver at each location can be combined into a single unit, for example by providing both a data source (e.g., a modulated laser or a fiber optic feed) and a data receiver (e.g., a photodetector or an outgoing optical fiber) at each transceiver 210, 220 and sharing much of the same telescope optics, including adaptive optics correction.

For example, in FIG. 2, optical beam 260 could also be encoded with data. Then, for data transmission from 210 to 220, transceiver 210 is the transmitter, beam 250 is the data-encoded primary beam, beam 260 is the probe beam, and transceiver 220 is the receiver. In the reverse direction, transceiver 220 is the transmitter, beam 260 is the data-encoded primary beam, beam 250 is the probe beam, and transceiver 210 is the receiver. Note that each beam 250, 260 serves two purposes. It is the data encoded primary beam in one direction and the probe beam in the other direction. An alternate implementation uses four beams: two data-encoded beams and two probe beams, all sharing the same telescope optics at both transceivers 210, 220.

FIG. 3 is an illustration of yet another FSO communications system using adaptive optics. This example uses a modulated retro reflector 330. The transmitter 310 transmits an optical beam 350A to the retro reflector 330. Modulation of the retro reflector 330 encodes data onto the beam and the retro reflector 330 reflects the data-encoded beam 350B back to the general vicinity of the original source 310. In one implementation, the same telescope 310 receives the return beam 350B. However, in many applications, the retro reflector 330 is limited in size and the diffraction-limited spot size of the return beam 350B is significantly larger than the size of the telescope aperture. Thus, a separate telescope 320 can be used as the receiver, as shown in FIG. 3. Alternately, the retro reflector 330 can be replaced by a reflector that is not retro. Adaptive optics modules can be used in either or both telescopes (and also in the retro reflector) to pre- or post-correct the optical beam 350, and the communications link can be either unidirectional or bi-directional.

FIGS. 1-3 are merely examples. Other applications will be apparent. Furthermore, the choice of wavelengths, data rate, link distance, telescope design, data sources and light sources, data receivers and other design choices will depend on the application. The FSO communications link itself can vary significantly depending on the application. In one application, both transceivers are ground-based and the link is primarily along the earth's surface. Examples include links in urban environments, rural environments or across bodies of water. In other applications, the link can be ground-to-air or air-to-ground (e.g., between a ground station and aircraft) or air-to-air (e.g., between aircraft). The FSO communications systems can also be either unidirectional or bi-directional, and utilize either single-ended or dual-ended adaptive optics correction. The principles described here apply to these situations.

Data rates and distances upwards of 100 Gbps and 27 km have been experimentally demonstrated, although different combinations of data rates and distances can be appropriate depending on the application. Wavelengths in the 1.55 μm (micron) wavelength region are currently preferred for telecommunications applications, although other wavelengths may be used and even preferred under certain atmospheric conditions or for other types of applications. For instance, the 1.3 μm wavelength region may perform well in a single wavelength mode. Terms such as "optical" or "light" are not intended to be limited to any one specific wavelength range. Nor are they meant to be limited to the visible region of the electromagnetic spectrum.

Any number of sources can be used for the data-encoded beam. For example, an optical fiber carrying a data-encoded optical signal can be directly coupled to the transmitting telescope. If the data signal is electrical, then an electrical-optical conversion can be made. For example, electrical data can be used to internally modulate a laser diode (or other light source). Alternately, the optical beam from a laser (or other light source) can be externally modulated by electrical data, for example via a Mach-Zender modulator. If the data signal is optical but of a wavelength that is incompatible with the present system, then a wavelength conversion can be made, such as from the 1.3 μm wavelength region to the 1.55 μm wavelength region. The wavelength conversion can be made by optical means (e.g., based on nonlinear optical phenomenon) or by optical-electrical-optical means.

At the receiver, the received optical beam may be processed or retransmitted in many different ways. For example, some of the incoming light may be coupled directly into an outgoing fiber. Alternately, it may be converted to electrical form by a photodetector or other optical-electrical converter. As a final example, it can be amplified and coupled into another FSO communications link for further transmission.

The adaptive optics module itself can also have different levels of sophistication. In simple applications, correction of only tip/tilt with or without focus may be sufficient. In more demanding applications, correction of higher order aberrations can be implemented. Simple first order adaptive optics corrections such as tip/tilt may be implemented or augmented by other components such as a steering mirror, leaving the adaptive optics module to correct for higher order aberrations.

The telescope optics can also vary. Refractive, reflective or hybrid designs can be used. In some applications (for example over short distances), a telescope may not be necessary. Alternately, collecting optics other than a telescope may be appropriate. Further examples of FSO communications systems using adaptive optics are described in U.S. patent application Ser. No. 09/892,913, "Atmospheric Optical Data Transmission System," filed Jun. 16, 2001 by J. Elon Graves and Malcolm J. Northcott, which is incorporated herein by reference.

Figure 4:
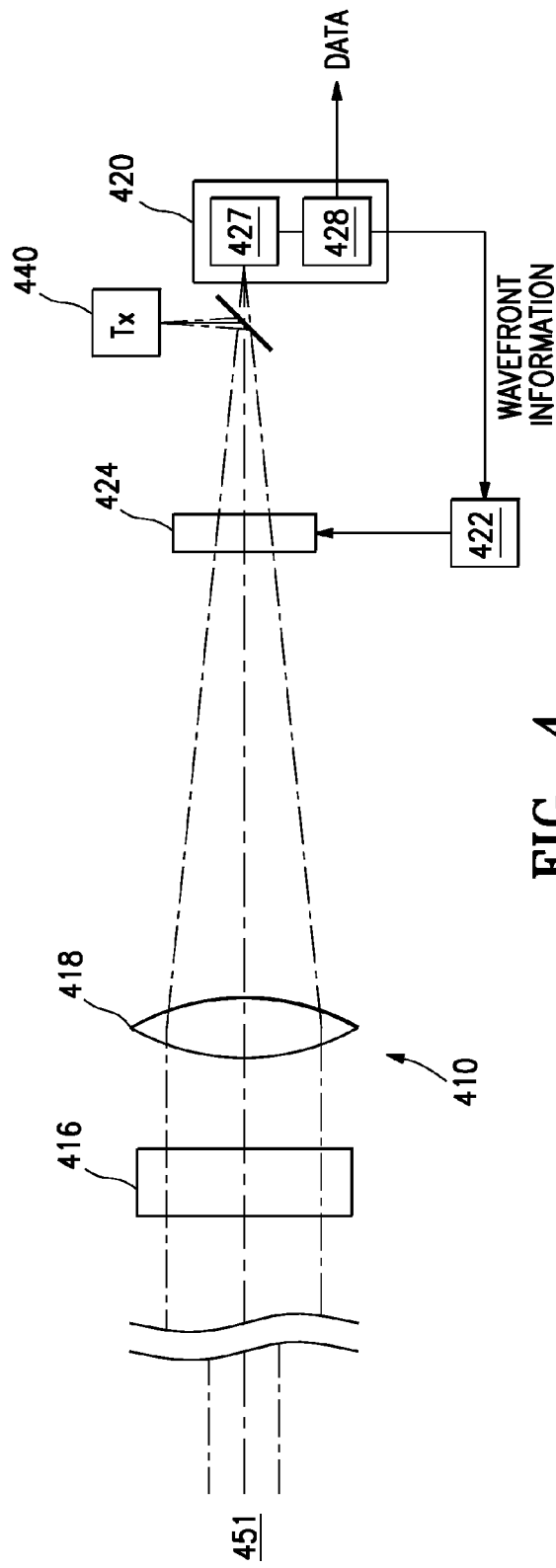
FIG. 4 is an illustration of an adaptive optics module according to the present invention.

FIG. 4 is an illustration of an adaptive optics module according to the invention. The system includes a telescope 410 (represented by lens 418 in FIG. 4), a variable phase device 424 and a device 420 that serves as both a wavefront sensor and a data detector. The variable phase device 424 and wavefront/data sensor 420 are located in the optical path of the telescope, with the wavefront/data sensor 420 downstream of the variable phase device 424. This system also includes a data source 440 for transmitting. In this example, the system also includes a beam-steering mechanism 416, for example a tip-tilt mirror.

In the receive direction, the system collects light 451 from a remote source (e.g., from the transmitting telescope) onto the wavefront/data sensor 420. The variable phase device 424 and wavefront/data sensor 420 form an adaptive optics loop that compensates for aberrations along the FSO communications link. The variable phase device 424 introduces an adjustable phase that compensates for the effects of unwanted aberrations, thus reducing the residual aberration in the wavefront. Examples of variable phase devices 424 include deformable mirrors, liquid crystal devices, MEMS mirrors, acousto-optic, thermo-optic, magneto-optic and electro-optic modulators, eidophors and optically written optically active materials. The wavefront sensing portion of the wavefront/data sensor 420 takes a measure of the actual amount of aberration or residual aberration and control module 422 sends the corresponding control signals to the variable phase device 424. In this way, the wavefront of the incoming optical beam can be corrected for aberrations, resulting in better image quality and/or collection efficiency at the data detection portion of the wavefront/data sensor 420.

In the transmit direction, the source 440 generates an optical beam that is to be transmitted over the same FSO communications link as the received optical beam. The optical beam from the source 440 is pre-corrected by the variable phase device 424. This increases the amount of energy incident on the receiving telescope and can also reduce scintillation effects. Note that much of the optical path traveled by the received optical beam and by the transmitted optical beam is common. Thus, the same adaptive optics correction can be applied both to post-correct the received optical beam and to pre-correct the transmitted optical beam.

In closed loop operation, the adaptive optics preferably corrects the wavefront at a rate that is significantly faster than the rate of change of aberrations along the optical path, for example preferably faster by about a factor of ten or more. If the aberrations are primarily caused by atmospheric conditions, it is desirable that the variable phase device 424 make adjustments at a rate of about 10 kHz or greater since turbulence microcells in the atmosphere change at a rate of about 1 kHz or less.

Focusing now on the combined wavefront/data sensor 420, the sensor 420 includes an optical-to-electrical converter 427 coupled to a separation module 428. Examples of optical-to-electrical converters 427 include photodetectors and coherent detectors (e.g., an optical local oscillator mixed with the incoming optical beam and then detected). The optical-to-electrical converter 427 converts the incoming optical beam to electrical form. The resulting electrical signal(s) shall be referred to as the intermediate electrical signal. The intermediate electrical signal contains both the data encoded on the optical beam and wavefront information about the wavefront of the optical beam. The separation module 428 receives the intermediate electrical signal and generates an electrical wavefront signal that contains the wavefront information and an electrical data signal that contains the data. The control module 422 controls the variable phase device 424 based on the electrical wavefront signal. The electrical data signal can be processed to recover the data.

The structure shown in FIG. 4 is merely one example of a combined wavefront/data sensor 420. Other designs can also be used. In one alternative, the incoming optical bean includes a primary beam that contains the information and a co-propagating probe beam at a different wavelength. The combined wavefront/data sensor 420 includes a sandwich or composite detector, which includes different detector layers that are sensitive to different wavelengths. For example, the top layer may contain detector elements that are sensitive to the probe beam wavelength and a bottom layer may contain detector elements that are sensitive to the wavelength of the primary beam. The electrical signal from the top layer then contains the wavefront information and the electrical signal from the bottom layer contains the data.

Figure 5:
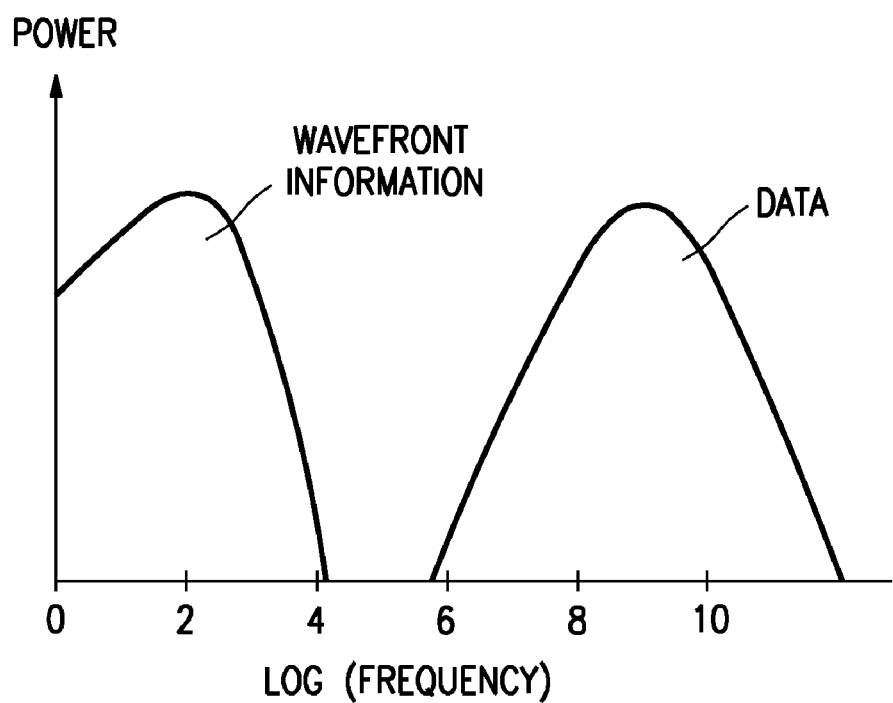
FIG. 5 is a power spectrum illustrating frequency separation of wavefront information and data.

Returning to the specific example shown in FIG. 4, in one approach, the wavefront information and the data are separated in frequency within the intermediate electrical signal. FIG. 5 shows an intermediate electrical signal where the wavefront information occupies a lower frequency band and the data occupies a higher frequency band. The separation module 428 then separates the wavefront information and the data on the basis of frequency.

The situation shown in FIG. 5 is not uncommon. For example, aberrations caused by atmospheric fluctuations typically have a bandwidth in the 1 to 10 kHz range, and data rates of greater than 1 MHz are not uncommon (e.g., 150 MHz for OC3, 1 GHz for Gigabit Ethernet, etc.). Note that in FIG. 5, the data does not have a DC component. Many communications protocols result in (or even require) zero DC component. For example, the data may be encoded using NRZ with 8B/10B encoding, or variants thereof.

Figure 6:
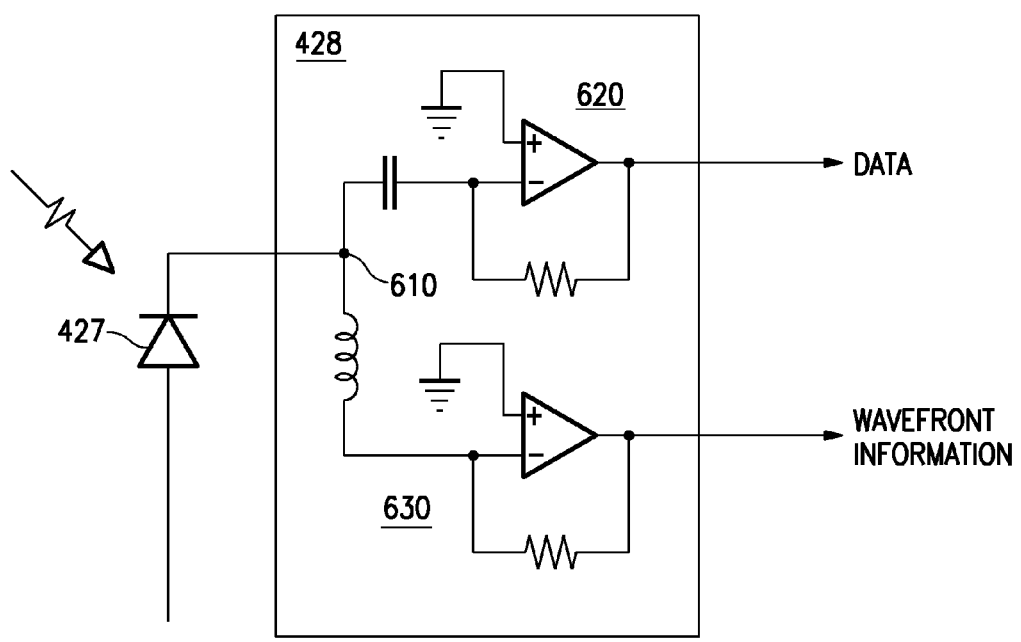
FIG. 6 is a circuit diagram of one example of a separation module.

Frequency separation of the data and wavefront information can be accomplished using a variety of methods. For example, tuned circuits/frequency filters can be used. FIG. 6 is a circuit diagram of one example. Here, the optical-to-electrical converter 427 is implemented as a photodiode or similar device that generates a current proportional to the incident light intensity. The incoming intermediate electrical signal is split at junction 610 into two components. Amplifier circuit 620 acts as a high pass filter and selects the high frequency data portion of the intermediate electrical signal, blocking the wavefront information. Similarly, amplifier circuit 630 acts as a low pass filter and selects the low frequency wavefront information, blocking the data.

Figure 7:
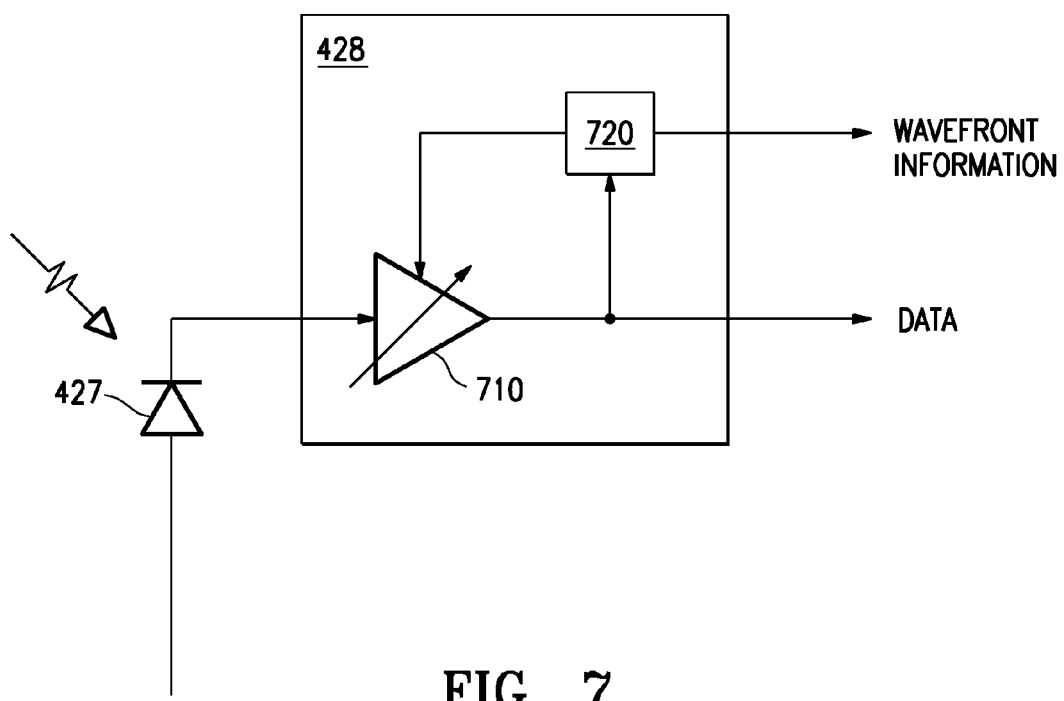
FIG. 7 is a block diagram of another example of a separation module.

FIG. 7 is a block diagram of another example based on auto gain circuitry. In this example, a variable gain block 710 applies a time-varying gain to the intermediate electrical signal in order to equalize the amplitude of the signal. This may be desired so that zero crossings can be more accurately estimated. The auto gain control module 720 samples the outgoing signal and adjusts the gain accordingly. If the auto gain circuit is fast enough, the time-varying gain will compensate for variations introduced by the wavefront signal. Thus, the wavefront information signal can be retrieved from the time-varying gain applied by the auto gain circuit, and the data can be recovered from the amplitude-equalized signal.

Figure 8:
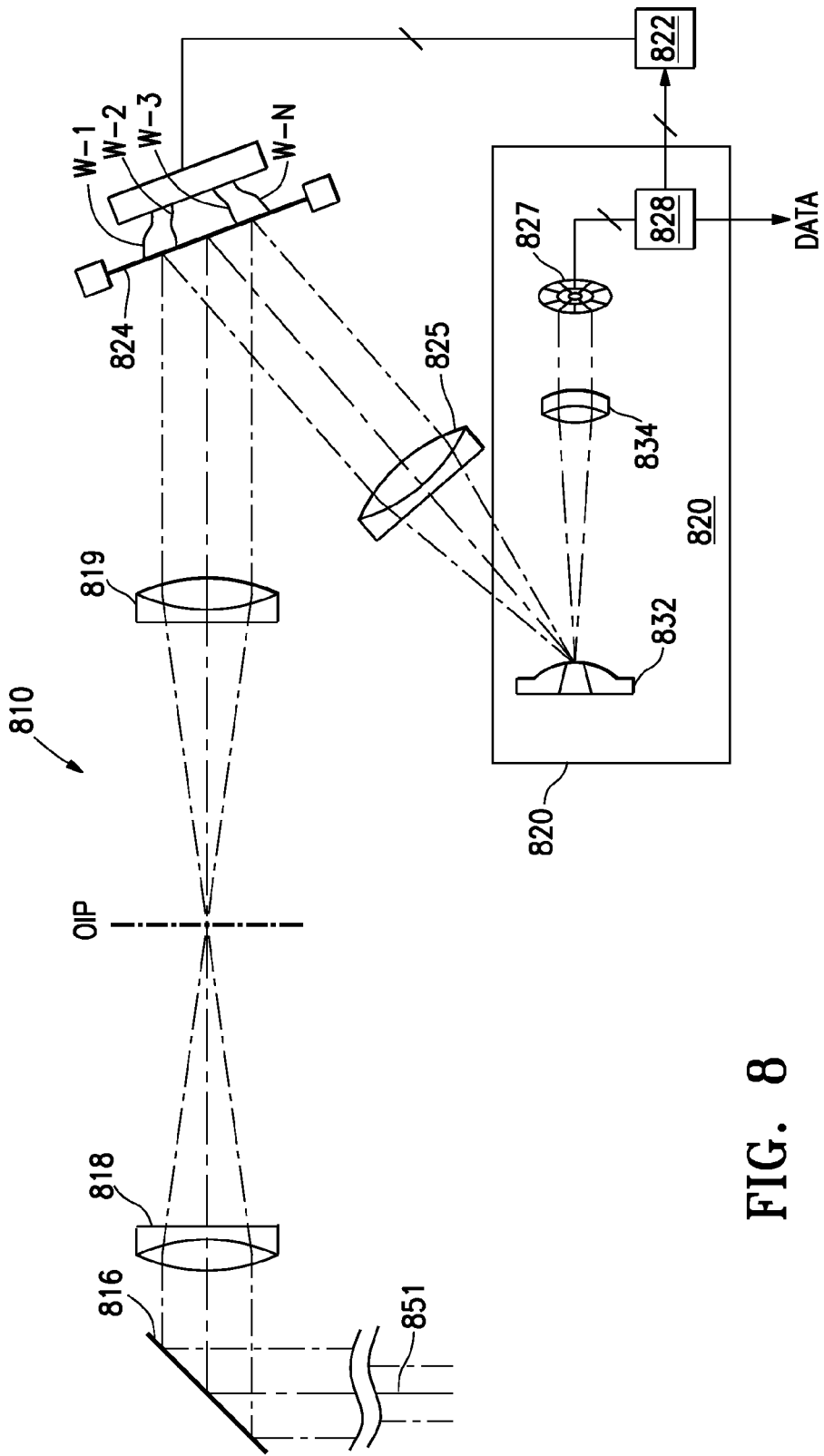
FIG. 8 is an illustration of one implementation of the adaptive optics module of FIG. 4.

FIG. 8 is an illustration of a specific implementation of the adaptive optics module of FIG. 4. This system includes a telescope 810 with an adaptive optics module. Light rays 851 from the remote light source enter the system via the tip-tilt mirror 816.

In one embodiment, the receiving telescope 810 is designed to be positioned vertically. The tip-tilt mirror 816 can be pivoted about two perpendicular axes, one on the vertical axis of the telescope like a turret and the other horizontal in the plane of the mirror, to cause tip and tilt adjustments. As an alternative, the telescope 810 may be rotatable about its vertical axis so that one axis of rotation for the mirror 816 may be eliminated. Other alternative arrangements may be used for the coarse pointing or aiming of the telescope, such as using other tip-tilt mirrors or translating the objective lens by small amounts.

Returning to FIG. 8, from the tip-tilt mirror 816, the light rays travel through a lens 818 that focuses the light rays on an object image plane OIP where the image of the remote light source exists in focus but is uncorrected. The light rays then pass through a collimating lens 819 to a deformable mirror 824. The deformable mirror 824 is dynamically shaped to correct for aberrations in the wavefront. It is controlled according to wavefront measurements made by the wavefront/data sensor 820. The conjugates of the deformable mirror 824 can be adjusted, for example by inserting a conjugate tuning element at the OIP. Examples of conjugate tuning elements include an insertable lens, zoom lens, or a second deformable mirror.

Various types of wavefront sensors and deformable mirrors may be used. In this example, the deformable mirror 824 is a deformable curvature mirror based on applying different voltages across different areas of a piezoelectric material, thus causing deformation. Further details for this type of deformable mirror are described and shown in U.S. Pat. No. 6,464,364, "Deformable Curvature Mirror," filed Jan. 25, 2001 and issued Oct. 15, 2002, by J. Elon Graves and Malcolm J. Northcott; U.S. Pat. No. 6,568,647, "Mounting Apparatus for Deformable Mirror," filed Jan. 25, 2001 and issued May 27, 2003, by J. Elon Graves and Malcolm J. Northcott; and U.S. patent application Ser. No. 09/892,913, "Atmospheric Optical Data Transmission System," filed Jun. 16, 2001 by J. Elon Graves and Malcolm J. Northcott. All of the foregoing are incorporated herein by this reference.

In the example of FIG. 8, the wavefront sensor portion of device 820 is a wavefront curvature sensor based on defocused pupil images. Further details for this type of wavefront curvature sensor are described and shown in U.S. Pat. No. 6,452,145, "Method and Apparatus for Wavefront Sensing," filed May 26, 2000 and issued Sep. 17, 2002, by J. Elon Graves and Malcolm J. Northcott; and U.S. patent application Ser. No. 09/892,913, "Atmospheric Optical Data Transmission System," filed Jun. 16, 2001 by J. Elon Graves and Malcolm J. Northcott. All of the foregoing are incorporated herein by this reference.

The light rays reflect from the surface of the deformable mirror 824 to a lens 825 that refocuses the image on a vibrating membrane mirror 832. The light is reflected from the vibrating membrane mirror 832 through a lens 834 onto a segmented detector 827. When the membrane mirror 832 is not vibrating, that is, when it is flat, the deformable mirror 824 is imaged onto the detector 827. However, when the membrane mirror 832 vibrates, it flexes between concave and convex conditions so that the image is defocused, alternately positively and negatively, onto the detector 827. This wavefront information is extracted by the separation module 828 and then communicated to the control module 822 for determining the curvature of the wavefront.

The membrane mirror 832 vibrates at a frequency that typically does not exceed a few tens of kilohertz. The optical path (or defocus) is effectively dithered at this same frequency and the wavefront information occupies a frequency band around the dither frequency. The separation module 828 in this case separates the wavefront information and the data on the basis of frequency.

Software within the control module 822 derives the wavefront curvature and corresponding control signals are provided to the deformable mirror 824. Specifically, the variable focus dither introduced by the membrane mirror 832 results in a signal component at the dither frequency. The magnitude of this component is proportional to the wavefront curvature within the pupil and proportional to the wavefront radial tilt on the boundary of the pupil. The wavefront is derived or recovered by solving the Poisson equation with respect to intensities with Neumann boundary conditions relative to the shape of the extra focal images. An iterative data reduction algorithm or other non-linear fitting technique may be employed to compensate for non-linearity in measurements in an open loop system.

The control module 822 provides separate and controlled high voltage signals to electrode segments on the back of the deformable mirror 824, as represented by the reference numerals W-1 through W-N. The deformable mirror 824 is positioned to reflect light rays from the collimating lens 819 to the wavefront/data sensor 820. The overall slope and curvature of the deformable mirror 824 can be controlled by varying the voltages applied to the electrodes.

In this implementation, the detector 827 is segmented. The optical pupil is divided into subapertures, with each subaperture portion of the optical beam falling on a separate detector segment. Each detector segment generates a separate electrical signal. Thus, the intermediate electrical signal from the segmented detector 827 to the separation module 828 actually includes multiple intermediate electrical signals as indicated by the slash across the line running from the segmented detector 827 to the separation module 828. Each intermediate electrical signal provides information about the overall wavefront and the wavefront determination is made by processing the separate intermediate electrical signals. For data detection purposes, the segmented detector 827 essentially operates as a light bucket. Data is recovered by combining some or all of the intermediate electrical signals and processing the combined signal.

For example, if the optical beam is divided into N subapertures, detector 827 may have N segments generating N intermediate electrical signals. Separation module 828 may low pass filter each of these to produce N separate electrical wavefront signals, which are then processed by the control module 822. Simultaneously, separation module 828 high pass filters the signals and combines the results to produce a single electrical data signal.

One benefit of combining wavefront sensing and data detection is a simple and robust configuration. The number of detectors typically is reduced and there is no requirement to register separate wavefront and data detectors. Another advantage becomes apparent under severe turbulence conditions, where multiple optical paths may contribute to light in the telescope pupil. This can lead to several "mirage" images in the image plane. Mirage images can lead to loss of coupling to a single mode fiber, either due to the adaptive optics module guiding to a mid-position between two "mirage" images, or due to the transfer of energy from one mirage image to another, causing the adaptive optics module to snap between images. While mirage image can cause dropouts when coupling to a single mode fiber, the light level in the pupil is largely unaffected. Thus the combined wavefront sensor and data detector typically will give more robust performance under severe turbulence conditions.

Figure 9A:
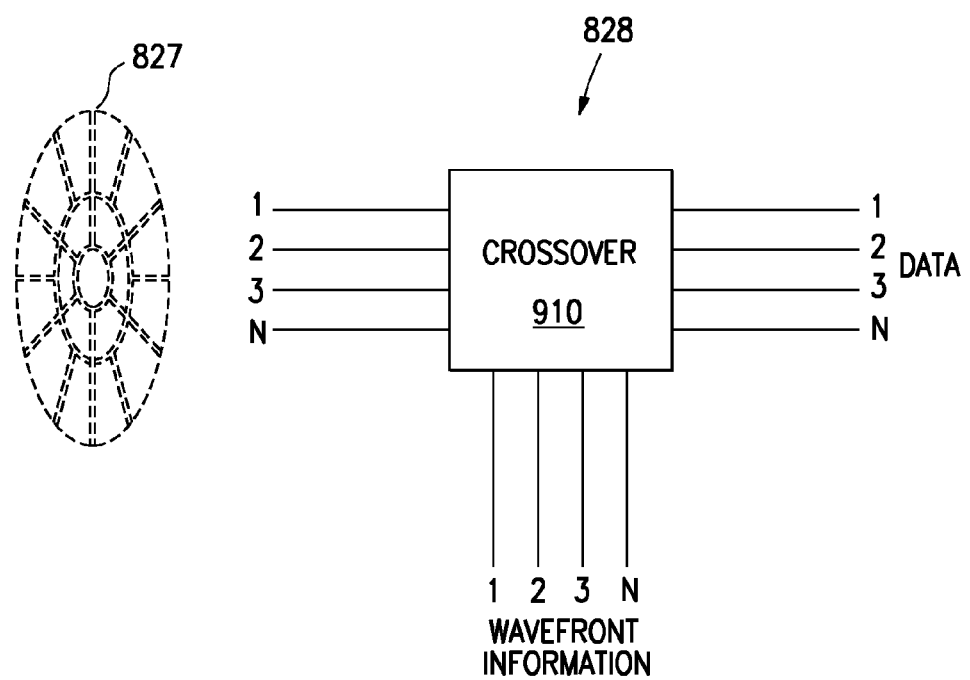
FIGS. 9A-9C are circuit diagrams of different crossover networks.
Figure 9B:
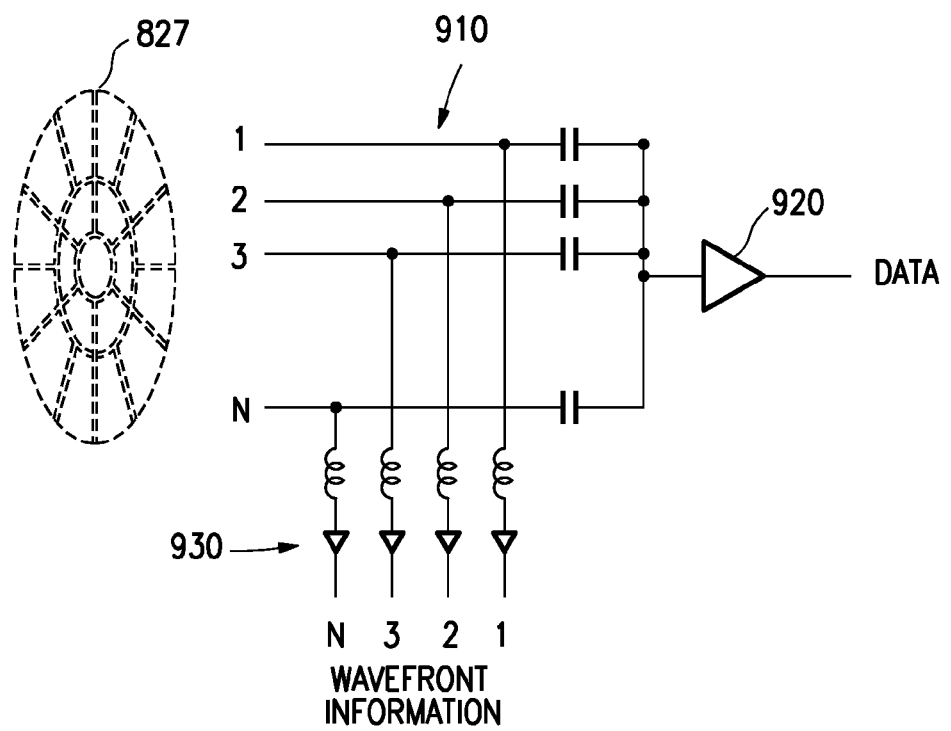
Figure 9C:
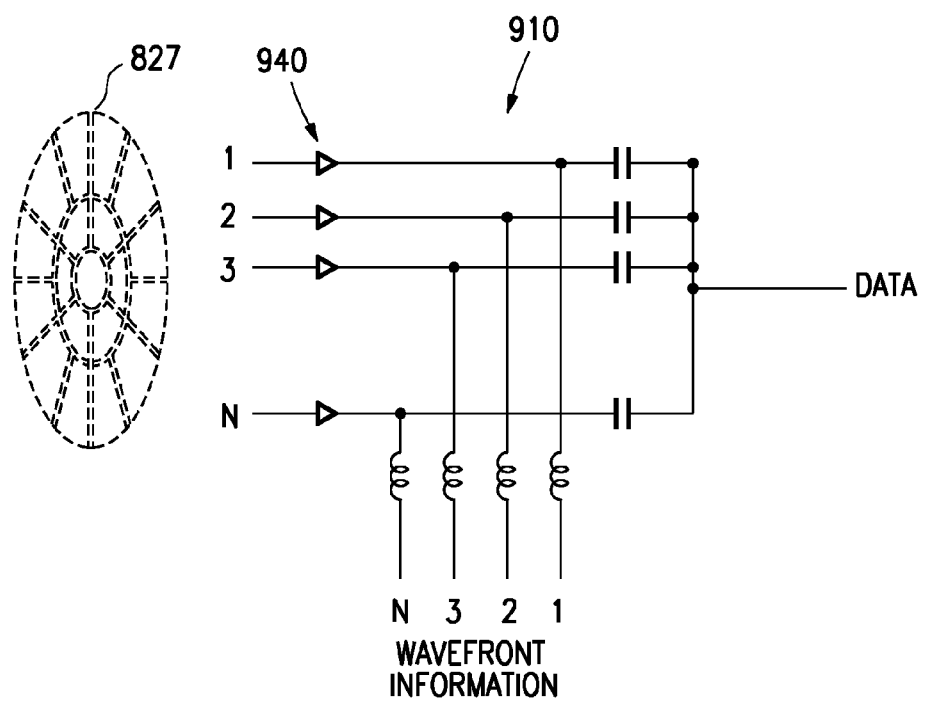

FIGS. 9A-9C are circuit diagrams of different implementations of the separation module 828. In FIG. 9A, the separation module 828 is implemented as an electrical crossover network 910. The crossover network 910 splits each of the N outputs from the segmented detector 827 into a high-frequency component (i.e., the data signal) and a low-frequency component (i.e., the wavefront signal). In this example, the separation is performed individually for each incoming intermediate electrical signal, resulting in N outgoing electrical data signals and N outgoing electrical wavefront signals.

FIG. 9B illustrates one embodiment of a crossover network 910. In this example, capacitors block the low frequency components and inductors block the high frequency components. In addition, the N data signals are summed to form a single "composite" electrical data signal. The crossover network 910 is followed by amplification. One amplifier 920 is used for the composite data signal and separate amplifiers 930 are used for each of the N wavefront signals.

FIG. 9C is similar to FIG. 9B, except that amplification occurs before separation. Amplifiers 940 amplify the N intermediate electrical signals before the data and wavefront information are separated. Other crossover embodiments are possible, for example based on transformer coupling, a directional coupler or transmission-line coupling for the high-frequency components; and resistive or inductive isolation for the low frequency components.

Although the detailed description contains many specifics, these should not be construed as limiting the scope of the invention but merely as illustrating different examples and aspects of the invention. It should be appreciated that the scope of the invention includes other embodiments not discussed in detail above.

For example, it is possible and may be preferable in some cases for the variable phase device 424, 824 to be the outermost element of the optical train, as opposed to located within the telescope optics. The variable phase device 424, 824 can also be implemented as more than one device. For example, separate devices may be used to post-correct the incoming beam and pre-correct the outgoing beam. Alternately, a common correction may be applied to both the incoming and outgoing beams, with additional devices providing incremental (or differential) correction. Such an arrangement may be beneficial, for instance, in communicating with satellites, where an optical beam may have a degree of "point ahead" to compensate for satellite motion. It is also possible to apply adaptive optics correction in an open loop manner, such that the wavefront sensor measures the aberration before correction, instead of the residual aberration after correction.

As another variation, the control module 422, 822 may combine information from other systems or sensors with the wavefront information in order to improve performance. Examples include the use of orbital element information on satellites to compute point-ahead angles, or the use of rotation rate sensors on movable platforms to improve the bandwidth of steering corrections. The transmitter may also receive information from external systems, including the control module. Such information could include management information for the communications link or state information for the transmitter such as wavelength preference, power level, point ahead requirement or polarization request.

Under some circumstances, the use of coherent (for example QPSK) data detection can significantly increase the sensitivity. In one approach, the optical local oscillator is mixed with the incoming light in the pupil plane. The resulting modulation is detected using an array detector, for example an array of photodiodes. In this case, differing optical aberrations over each of the detectors will shift the phase of the recovered data signals, so phase correction is applied before the various pupil plane signals are combined. If a phase tracking signal combiner is used, the relative phase of each of the recovered signals gives a direct measure of the atmospheric phase aberrations over the corresponding pupil area. Coherent detection of the wavefront gives sufficient measurement accuracy that, given a similarly accurate compensation device, correction could be applied open loop.

As another example, different functions described above can be implemented in different physical forms. Depending on the specific application, functionality can be implemented as hardware, firmware, software, and/or combinations of these. In much of the description above, different functions were implemented as dedicated circuitry in order to take advantage of lower power consumption and higher speed. In other applications, the same functionality can be implemented as software, typically running on digital signal processors or even general-purpose processors. Various combinations can also be used. For example, certain operations may be common enough as to be available as standard components, software, or circuit designs. These may be combined with customized implementations of the remaining functionality.

Similarly, "coupling" between modules may also take different forms. Dedicated circuitry can be coupled to each other by hardwiring, by a shared bus or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components.

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents. Furthermore, no element, component or method step is intended to be dedicated to the public regardless of whether the element, component or method step is explicitly recited in the claims.

What is claimed is:

1. A device for wavefront sensing and data detection, the device comprising:
   an optical-to-electrical converter for receiving an optical beam encoded with data and converting the optical beam to an intermediate electrical signal, the intermediate electrical signal containing the data and further containing wavefront information sensed from a wavefront of the optical beam by the optical-to-electrical converter; and
   a separation module coupled to the optical-to-electrical converter for generating an electrical wavefront signal and an electrical data signal from the intermediate electrical signal, the electrical wavefront signal containing the wavefront information and the electrical data signal containing the data.

2. The device of claim 1 wherein the optical-to-electrical converter comprises:
   a photodetector.

3. The device of claim 1 wherein the optical-to-electrical converter comprises:
   a coherent detector.

4. The device of claim 1 wherein, within the intermediate electrical signal, the wavefront information and the data are separated in frequency; and the separation module separates the wavefront information and the data on the basis of frequency.

5. The device of claim 4 wherein the wavefront information is located at frequencies that are lower than frequencies where the data is located.

6. The device of claim 4 wherein the wavefront information is located at frequencies less than 1 MHz and the data is located at frequencies greater than 1 MHz.

7. The device of claim 4 wherein, within the intermediate electrical signal, the data is encoded with a zero DC component.

8. The device of claim 4 wherein the wave front information is generated by dithering an optical path of the optical beam at a dither frequency, and the wavefront information is located in a frequency band around the dither frequency.

9. The device of claim 4 wherein the separation module comprises:
   a splitter for splitting the intermediate electrical signal into at least two components;

a first frequency filter coupled to receive one of the components for producing the electrical wavefront signal; and a second frequency filter coupled to receive another of the components for producing the electrical data signal.

10. The device of claim 4 wherein the separation module comprises:

a variable gain block for applying a time-varying gain to the intermediate electrical signal; and an automatic gain control module coupled to the variable gain block for adjusting the time-varying gain in order to equalize an amplitude of the intermediate electrical signal, wherein the equalized intermediate electrical signal contains the data and the time-varying gain contains the wavefront information.

11. The device of claim 1 wherein:

the optical-to-electrical converter comprises multiple detector elements for receiving subaperture portions of the optical beam and converting the subaperture portions of the optical beam to intermediate electrical signals; and the separation module generates the electrical wavefront signal based on separate intermediate electrical signals, and generates the electrical data signal based on combined intermediate electrical signals.

12. The device of claim 11 wherein the separation module generates the electrical data signal based on a sum of intermediate electrical signals.

13. The device of claim 11 wherein, within the intermediate electrical signals, the wavefront information and the data are separated in frequency; and the separation module separates the wavefront information and the data on the basis of frequency.

14. The device of claim 11 wherein the separation module comprises:

a crossover network for receiving the intermediate electrical signals and separating the wavefront information and the data.

15. The device of claim 11 wherein the separation module comprises:

an amplifier for each of the separate intermediate electrical signals; and an amplifier for the combined intermediate electrical signals.

16. An adaptive optics module for wavefront correction and data transmission, the adaptive optics module comprising:

a combined wavefront/data sensor for receiving an optical beam encoded with data and generating an electrical wavefront signal and an electrical data signal from the optical beam, the electrical wavefront signal containing wavefront information sensed from a wavefront of the optical beam by the combined wavefront/data sensor and the electrical data signal containing the data; and a variable phase device coupled to the combined wavefront/data sensor and located in an optical path of the optical beam, the variable phase device for introducing an adjustable phase in the optical path in response to the electrical wavefront signal.

17. The adaptive optics module of claim 16 wherein the combined wavefront/data sensor comprises:

an optical-to-electrical converter for receiving the optical beam and converting the optical beam to an intermediate electrical signal, the intermediate electrical signal containing the data and the wavefront information; and a separation module coupled to the optical-to-electrical converter for generating the electrical wavefront signal and the electrical data signal from the intermediate electrical signal.

18. The adaptive optics module of claim 17 further comprising:

a vibrating mirror located upstream of the optical-to-electrical converter, the vibrating mirror introducing a defocus in the pupil images, wherein the optical-to-electrical converter receives the defocused pupil images.

19. The adaptive optics module of claim 16 further comprising:

a transmitter for generating a counter-propagating data-encoded optical beam, wherein the transmitter is located so that the variable phase device pre-corrects the counter-propagating data-encoded optical beam.

20. The adaptive optics module of claim 16 wherein the variable phase device comprises:

a deformable mirror.

21. The adaptive optics module of claim 20 wherein the deformable mirror is a deformable curvature mirror.

22. The adaptive optics module of claim 21 wherein the deformable curvature mirror comprises:

first and second parallel plates of an electro-restrictive material, said first and second plates laminated together, said first plate having an outer surface and a mirrored surface on said first plate outer surface, and said second plate having an outer surface with a pattern of electrode segments on said second plate outer surface, each said segment having a separate electrical terminal for applying a variable electrical voltage thereto for selectively deforming the deformable curvature mirror.

23. The adaptive optics module of claim 16 wherein the wavefront information includes wavefront curvature.

24. The adaptive optics module of claim 16 further comprising:

telescope optics for collecting the optical beam.

25. The adaptive optics module of claim 16 wherein the adjustable phase corrects only for aberrations that are of equal or lesser order than tip/tilt.

26. The adaptive optics module of claim 16 wherein the adjustable phase corrects for at least one aberration that is of equal or greater order than focus.

27. The adaptive optics module of claim 16 wherein:

the optical beam comprises a primary beam encoded with the data and a co-propagating probe beam; and the combined wavefront/data sensor comprises:

a first detector layer sensitive to a wavelength of the primary beam, for converting the primary beam to the electrical data signal; and a second detector layer sensitive to a wavelength of the probe beam and overlapping with the first detector layer, the second detector layer for converting the probe beam to the electrical wavefront signal.

28. An FSO transceiver comprising:

telescope optics for collecting an optical beam encoded with data;

a deformable curvature mirror located in an optical path of the optical beam, the deformable curvature mirror for introducing an adjustable phase in the optical path in response to an electrical wavefront signal; and a device for wavefront sensing and data detection located in the optical path downstream of the deformable curvature mirror, the device comprising:

an optical-to-electrical converter for converting the optical beam to an intermediate electrical signal, the intermediate electrical signal containing the data and further containing wavefront information sensed from a wavefront curvature of the optical beam by the optical-to-electrical converter; and a separation module coupled to the optical-to-electrical converter for generating the electrical wavefront signal and an electrical data signal from the intermediate electrical signal, the electrical wavefront signal containing the wavefront information and the electrical data signal containing the data.

29. The FSO transceiver of claim 28 wherein the device for wavefront sensing and data detection further comprises a vibrating mirror located upstream of the optical-to-electrical converter, the vibrating mirror introducing a defocus in the pupil images, wherein the optical-to-electrical converter receives the defocused pupil images.

30. The FSO transceiver of claim 29 wherein:
the defocus in the pupil images is at a dither frequency;
the wavefront information is located in a frequency band around the dither frequency and the data is located at frequencies higher than the frequency band where the wavefront information is located; and
the separation module separates the wavefront information and the data on the basis of frequency.

31. The FSO transceiver of claim 28 wherein:
the deformable curvature mirror comprises first and second parallel plates of an electro-restrictive material, said first and second plates laminated together, said first plate having an outer surface and a mirrored surface on said first plate outer surface, and said second plate having an outer surface with a pattern of electrode segments on said second plate outer surface, each said segment having a separate electrical terminal for applying a variable electrical voltage thereto for selectively deforming the deformable curvature mirror;
the optical-to-electrical converter receives defocused images of the deformable curvature mirror and the optical-to-electrical converter comprises multiple detector elements for receiving subaperture portions of the optical beam and converting the subaperture portions of the optical beam to intermediate electrical signals; and
the separation module generates the electrical wavefront signal based on separate intermediate electrical signals, and generates the electrical data signal based on combined intermediate electrical signals.

32. The FSO transceiver of claim 28 further comprising:
a transmitter for generating a counter-propagating data-encoded optical beam, wherein the transmitter is located so that the deformable curvature mirror pre-corrects the counter-propagating data-encoded optical beam.

33. A method for wavefront sensing and data detection comprising:
receiving an optical beam encoded with data;
converting the optical beam to an intermediate electrical signal, the intermediate electrical signal containing the data and further containing wavefront information sensed from a wavefront of the optical beam during said conversion; and
generating an electrical wavefront signal and an electrical data signal from the intermediate electrical signal, the electrical wavefront signal containing the wavefront information and the electrical data signal containing the data.

34. The method of claim 33 wherein:
within the intermediate electrical signal, the wavefront information and the data are separated in frequency; and
the step of generating an electrical wavefront signal and an electrical data signal from the intermediate electrical signal comprises separating the wavefront information and the data on the basis of frequency.

35. The method of claim 34 wherein the wavefront information is generated by dithering an optical path of the optical beam at a dither frequency, and the wavefront information is located in a frequency band around the dither frequency.

36. The method of claim 33 wherein:
the step of converting the optical beam to an intermediate electrical signal comprises converting subaperture portions of the optical beam to intermediate electrical signals; and
the step of generating an electrical wavefront signal and an electrical data signal from the intermediate electrical signals comprises:
generating the electrical wavefront signal based on separate intermediate electrical signals, and
generating the electrical data signal based on combined intermediate electrical signals.

37. A method for wavefront correction and data transmission comprising:
receiving an optical beam encoded with data;
converting the optical beam to an intermediate electrical signal, the intermediate electrical signal containing the data and further containing wavefront information sensed from a wavefront of the optical beam during said conversion;
generating an electrical wavefront signal and an electrical data signal from the intermediate electrical signal, the electrical wavefront signal containing the wavefront information and the electrical data signal containing the data; and
adjusting a phase in an optical path of the optical beam in response to the electrical wavefront signal.

38. The method of claim 37 further comprising:
generating a counter-propagating data-encoded optical beam, wherein the adjusted phase of the optical path pre-corrects the counter-propagating data-encoded optical beam.

39. The method of claim 37 wherein the step of adjusting a phase of an optical path comprises adjusting a curvature of a wavefront of the optical beam.

40. The method of claim 37 wherein the wavefront information includes wavefront curvature.

41. A method for FSO data transmission comprising:
collecting an optical beam encoded with data;
converting the optical beam to an intermediate electrical signal, the intermediate electrical signal containing the data and further containing wavefront information sensed from a wavefront curvature of the optical beam during said conversion;
generating an electrical wavefront signal and an electrical data signal from the intermediate electrical signal, the electrical wavefront signal containing the wavefront information and the electrical data signal containing the data; and
adjusting a phase in an optical path of the optical beam in response to the electrical wavefront signal.

42. The method of claim 41 wherein:
the step of converting the optical beam to an intermediate electrical signal comprises:
dithering the optical path of the optical beam at a dither frequency to generate defocused pupil images, and
converting the defocused pupil images to the intermediate electrical signal;
the wavefront information is located in a frequency band around the dither frequency and the data is located at frequencies higher than the frequency band where the wavefront information is located; and the step of generating an electrical wavefront signal and an electrical data signal from the intermediate electrical signal comprises separating the wavefront information and the data on the basis of frequency.

43. The method of claim 41 further comprising:
generating a counter-propagating data-encoded optical beam, wherein the adjusted phase of the optical path pre-corrects the counter-propagating data-encoded optical beam.

* * * * *